United States Patent
Koh et al.

(10) Patent No.: US 9,918,115 B2
(45) Date of Patent: Mar. 13, 2018

(54) SYSTEM AND METHOD FOR OBTAINING VIDEO STREAMS

(71) Applicant: GOOGLE INC., Mountain View, CA (US)

(72) Inventors: Justin Koh, Mountain View, CA (US); Pierre-Yves Laligand, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/350,022

(22) PCT Filed: Oct. 2, 2012

(86) PCT No.: PCT/US2012/058470
§ 371 (c)(1),
(2) Date: Apr. 4, 2014

(87) PCT Pub. No.: WO2013/052490
PCT Pub. Date: Apr. 11, 2013

(65) Prior Publication Data
US 2014/0250480 A1   Sep. 4, 2014

Related U.S. Application Data

(60) Provisional application No. 61/543,261, filed on Oct. 4, 2011.

(51) Int. Cl.
*H04N 21/462* (2011.01)
*H04N 21/266* (2011.01)
(Continued)

(52) U.S. Cl.
CPC ..... *H04N 21/266* (2013.01); *H04N 21/23109* (2013.01); *H04N 21/2665* (2013.01);
(Continued)

(58) Field of Classification Search
CPC ........... H04N 21/4622; H04N 21/8586; H04N 21/266; H04N 21/23109; H04N 21/2665;
(Continued)

(56) References Cited

U.S. PATENT DOCUMENTS 6,326,982 B1   12/2001 Wu et al.
6,389,467 B1 *  5/2002 Eyal .................. G06F 17/30038
                                                    707/E17.009
(Continued)

FOREIGN PATENT DOCUMENTS

CN         101124561 A      2/2008
CN         101383783 A      3/2009
(Continued)

OTHER PUBLICATIONS

Google Inc., International Preliminary Report on Patentability, PCT/US2012/058470, Apr. 8, 2014, 10 pages.
(Continued)

*Primary Examiner* — Pankaj Kumar
*Assistant Examiner* — Alexander Boyd
(74) *Attorney, Agent, or Firm* — Morgan, Lewis & Bockius LLP

(57) ABSTRACT

A system, computer-readable storage medium storing at least one program, and a computer-implemented method for obtaining video streams is presented. A device-agnostic request to obtain a video stream is received from an application executing on a client device, the device-agnostic request including a universal resource identifier (URI) for the video stream, the URI including a type of the video stream and at least one of a name of the video stream and device-specific parameters for the video stream. The URI is analyzed to identify a media device from which the video stream is available. A device-specific library for the media device is identified. A device-specific request corresponding
(Continued)

to the device-agnostic request is executed to obtain the video stream, the device-specific request including the URI. The video stream is received from the media device responsive to executing the device-specific request. The video stream is provided to the application.

22 Claims, 8 Drawing Sheets

(51) Int. Cl.
| | | |
|---|---|---|
| *H04N 21/482* | (2011.01) | |
| *H04N 21/231* | (2011.01) | |
| *H04N 21/2665* | (2011.01) | |
| *H04N 21/433* | (2011.01) | |
| *H04N 21/443* | (2011.01) | |
| *H04N 21/436* | (2011.01) | |
| *H04N 21/6408* | (2011.01) | |
| *H04N 21/643* | (2011.01) | |
| *H04N 21/232* | (2011.01) | |

(52) U.S. Cl.
CPC ... *H04N 21/4332* (2013.01); *H04N 21/43615* (2013.01); *H04N 21/4431* (2013.01); *H04N 21/4622* (2013.01); *H04N 21/4828* (2013.01); *H04N 21/232* (2013.01); *H04N 21/6408* (2013.01); *H04N 21/64322* (2013.01)

(58) Field of Classification Search
CPC ......... H04N 21/4332; H04N 21/43615; H04N 21/4431; H04N 21/4828; H04N 21/232; H04N 21/6408; H04N 21/64322
See application file for complete search history.

(56) References Cited

U.S. PATENT DOCUMENTS

| | | | | |
|---|---|---|---|---|
| 6,473,804 | B1* | 10/2002 | Kaiser et al. | 709/245 |
| 6,732,365 | B2* | 5/2004 | Belknap et al. | 719/328 |
| 7,206,853 | B2 | 4/2007 | Eytchison et al. | |
| 7,305,697 | B2 | 12/2007 | Alao et al. | |
| 2001/0049718 | A1 | 12/2001 | Ozawa | |
| 2002/0103920 | A1* | 8/2002 | Berkun et al. | 709/231 |
| 2002/0169771 | A1* | 11/2002 | Melmon et al. | 707/5 |
| 2003/0046437 | A1 | 3/2003 | Eytchison et al. | |
| 2003/0174160 | A1 | 9/2003 | Deutscher et al. | |
| 2007/0177466 | A1* | 8/2007 | Ando | H04N 21/4143 369/13.01 |
| 2007/0186003 | A1 | 8/2007 | Foster et al. | |
| 2008/0046929 | A1* | 2/2008 | Cho | H04N 21/4622 725/46 |
| 2008/0086747 | A1* | 4/2008 | Rasanen et al. | 725/46 |
| 2008/0178198 | A1 | 7/2008 | Gauba | |
| 2008/0263618 | A1 | 10/2008 | White | |
| 2008/0276289 | A1 | 11/2008 | van Ottele | |
| 2009/0089444 | A1 | 4/2009 | Lin et al. | |
| 2009/0094646 | A1 | 4/2009 | Walter et al. | |
| 2010/0095337 | A1 | 4/2010 | Dua | |
| 2010/0103371 | A1 | 4/2010 | Sarver et al. | |
| 2010/0199318 | A1* | 8/2010 | Chang et al. | 725/97 |
| 2010/0223357 | A1* | 9/2010 | Einarsson | H04N 21/4383 709/219 |
| 2010/0287582 | A1 | 11/2010 | Barnett, Jr. | |
| 2011/0231660 | A1 | 9/2011 | Kanungo | |
| 2012/0304233 | A1 | 11/2012 | Roberts et al. | |
| 2013/0080516 | A1* | 3/2013 | Bologh | H04N 21/26212 709/203 |
| 2014/0032523 | A1* | 1/2014 | Dyvadheenam | G06F 17/30887 707/708 |

FOREIGN PATENT DOCUMENTS

| | | |
|---|---|---|
| EP | 2749035 A1 | 3/2013 |
| KR | 20110053178 A | 5/2011 |
| KR | 2011-0102495 | 9/2011 |

OTHER PUBLICATIONS

Google Inc., International Search Report and Written Opinion, PCT/US2012/058470, Mar. 25, 2013, 15 pgs.
Google Inc., Supplementary European Search Report, EP 12838549.9, Jun. 25, 2015, 15 pgs.
Google Inc., Supplementary Partial European Search Report, EP 12838549.9, Mar. 6, 2015 6 pgs.
Google Inc., Notice to File a Rejection, KR 2014-7012047, Apr. 7, 2015, 4 pgs.
Broadcast and On-line Services: Search, select, and rightful use of content on personal storage systems (TV-anytime); Part 4, Phase 1—Content referencing: ETSI TS 102 822-4, IEEE, Lis, Sophia Antipolis Cedex, France, vol. BC, No. 11.3.1, Nov. 1, 2007, XP014040520.
Google Inc., Communication pursuant to Article 94(3) EPC, EP 12838549.9, dated May 31, 2016, 7 pgs.
Google Inc., Notice of Allowance, KR Patent Application 2014-7012047, dated Nov. 23, 2015, 1 pg.
Google Inc., Communication pursuant to Article 94(3) EPC, EP 12827343.0, dated May 31, 2016, 5 pgs.
Google Inc., Extended European Search Report, EP 12827343.0, dated Mar. 6, 2015, 9 pgs.
Google Inc., International Preliminary Report on Patentability, PCT/US2012/052370, dated Mar. 13, 2014, 7 pgs.
Google Inc., International Search Report and Written Opinion, PCT/US2012/052370, dated Dec. 26, 2012, 10 pgs.
Google Inc., Notice to File a Rejection, KR 2014-7012047, dated Apr. 7, 2015, 4 pgs.
Google Inc., Notification First Office Action, App. No. 201280059546.3, dated Oct. 19, 2016, 42 pgs.

\* cited by examiner

SYSTEM AND METHOD FOR OBTAINING VIDEO STREAMS

CROSS REFERENCE TO RELATED APPLICATIONS

This Application is a United States National Stage Application filed under 35 U.S.C. § 371 of PCT Patent Application Serial No. PCT/US2012/058470 filed on Oct. 2, 2012, which claims the benefit of and priority to U.S. Provisional Patent Application No. 61/543,261 filed on Oct. 4, 2011, which are hereby incorporated by reference in their entireties.

TECHNICAL FIELD

The disclosed implementations relate generally to obtaining video streams.

BACKGROUND

For a client device that acts as an intermediary device between a media device (e.g., a television set top box) and an output device (e.g., a television display), it is desirable for an application executing on the client device to obtain video streams from media devices that are accessible to the client device so that these video streams may be displayed on the output device. However, during development of the application, a developer of the application for the client device does not know which media devices in a plurality of media devices will be coupled to the client device. Furthermore, each media device that is coupled to the client device may have a different protocols and addressing mechanisms in which video streams that are available on the media device are obtained. Including these protocols and addressing mechanisms for all possible media devices in the application during development of the application is burdensome and impractical for the developer of the application.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

The implementations described herein provide techniques for obtaining a video stream that is available from media devices that are accessible to a client device.

System Architecture

Figure 1:
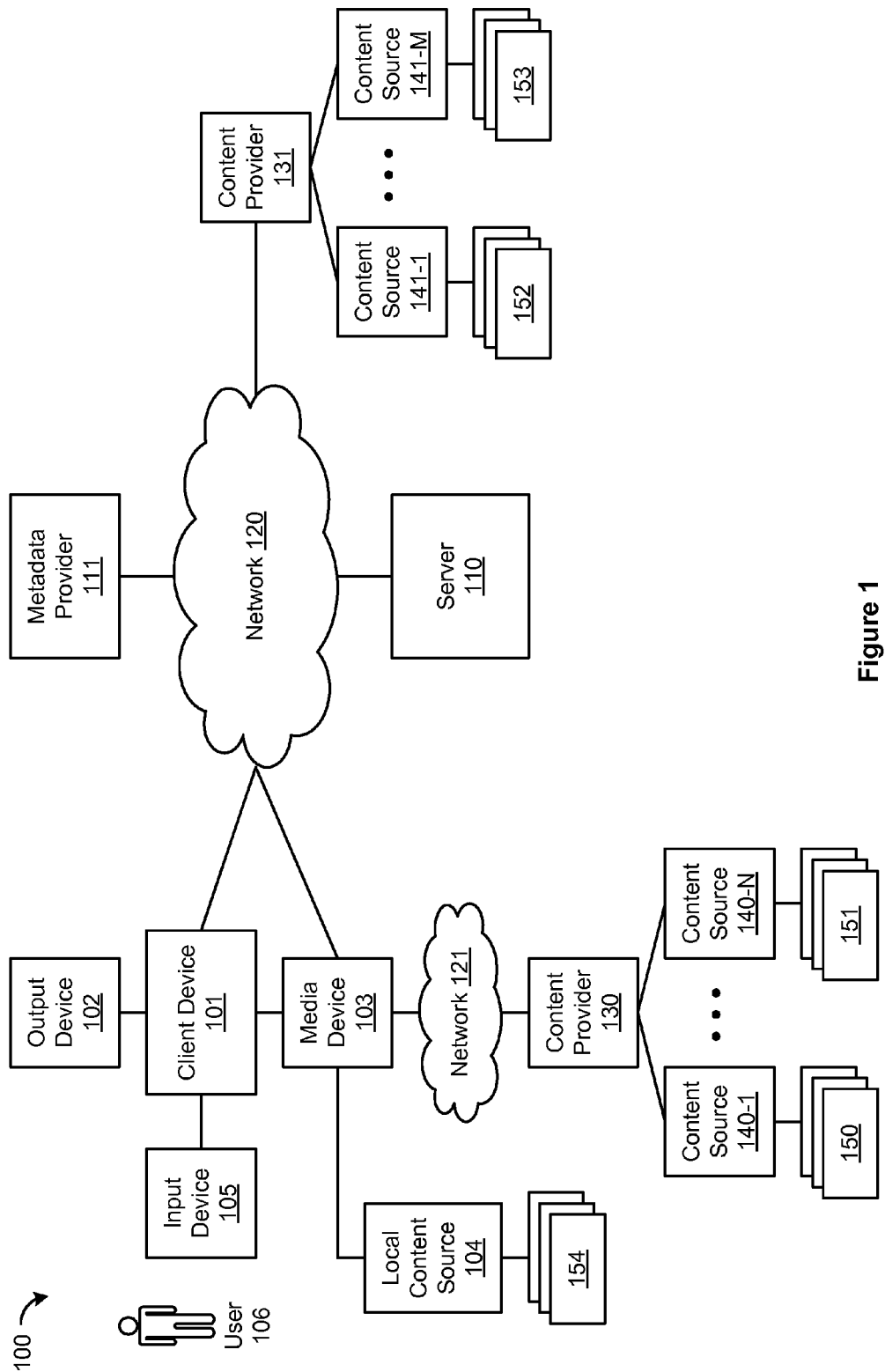
FIG. 1 is a block diagram illustrating an example network system, according to some implementations.

FIG. 1 is a block diagram illustrating an example network system 100, according to some implementations. The network system 100 includes a client device 101 coupled to an output device 102, a media device 103, and an input device 105 of a user 106. In some implementations, the client device 101 is a television set top box. In some implementations, the output device 102 includes one or more of a monitor, a projector, a television, and a speaker.

In some implementations, the client device 101 is an intermediary device that is configured to control devices coupled to the client device 101 (e.g., the media device 103, the output device 102, etc.) and that is configured to provide enhanced multimedia functionality. The enhanced multimedia functionality includes, but is not limited to, providing picture-in-picture capabilities on the output device 102 that allows the user 106 to simultaneously access (e.g., browse and/or otherwise interact with) web sites on the output device 102 (e.g., a television display) while watching and/or listening to an instance of a media item (e.g., a video) being presented in a smaller area of the output device 102, providing a user interface on the output device 102 that allows the user 106 to search for instances of media items that are available on content sources (e.g., a particular television channel, a streaming media service, etc.) that are accessible to the client device 101 of the user 106, and modifying audio and/or video signals received from the media device 103 (e.g., overlaying graphical objects in video stream, inserting audio into an audio stream, etc.) and outputting the modified audio and/or video signals to the output device 102 for presentation to the user 106.

Note that an "instance of a media item" may refer to a particular showing of the media item at a particular date and/or time on a particular content source (e.g., a showing of Episode 1 of the Simpsons at 10 PM on Jan. 3, 2011, on Channel 2 of an over-the-air television service, etc.) or a particular copy of the media item on a particular content source (e.g., Episode 1 of the Simpsons on streaming video service 1 for rent, Episode 1 of the Simpsons on streaming video service 2 for purchase, etc.).

A media item includes, but is not limited to, a movie, a video, a television program (e.g., an episode of a television series, a standalone television program, etc.), a book, an issue of a magazine, an article, a song, and a game.

A content source includes, but is not limited to, a digital video recorder, a satellite radio channel, an over-the-air radio channel, an over-the-air television channel, a satellite television channel, a cable television channel, a cable music channel, an Internet Protocol television channel, and a streaming media service (e.g., a video-on-demand service, a streaming video service, a streaming music service, etc.).

In some implementations, the user 106 uses the input device 105 to instruct the client device 101 to perform various actions with respect to the output device 102 and/or the media device 103. For example, the user 106 may use the input device 105 to instruct the client device 101 to increase the volume of the output device 102. Similarly, the user 106 may use the input device 105 to instruct the client device 101 to instruct the media device 103 to obtain instances of media items. Furthermore, the user 106 may use the input device 105 to instruct the client device 101 to search for instances of media items satisfying a search query. The interactions between the user 106, the client device 101, the output device 102, and the media device 103 are described in more detail with reference to FIGS. 3 and 4.

The input device 105 includes, but is not limited to, a pointing device (e.g., a mouse, a trackpad, a touchpad, a free space pointing device), a keyboard, a touch-sensitive display device (e.g., a touch-screen display and/or controller), a remote controller, a smart phone including a remote controller application, and a visual gesture recognition system (e.g., a system that captures and recognizes motions and/or gestures of a user and translates the motions and/or gestures into input commands).

In some implementations, the media device 103 is configured to obtain instances of media items from a content source and provide audio and/or video signals to be presented to the user 106 using the output device 102.

In some implementations, the media device 103 obtains instances of media items (e.g., instances of media items 154) from a local content source 104. In some implementations, the local content source 104 includes one or more of a digital video recorder of the media device 103, a hard disk drive of the media device 103, or a network storage device accessible by the media device 103.

In some implementations, the media device 103 obtains instances of media items (e.g., instances of media items 150 and 151) from content sources 140 provided by a content provider 130 via network 121. A "content provider" is an entity or a service that provides one or more content sources and a "content source" is a source of instances of media items (e.g., a television channel, a radio channel, a web site, a streaming media service, etc.). In some implementations, network 121 includes one or more of a cable television service, a satellite television service, a satellite radio service, an over-the-air television service, an over-the-air radio service, or a data network (e.g., network 120, the Internet, a virtual private network, etc.).

In some implementations, the media device 103 obtains instances of media items (e.g., instances of media items 152 and 153) from content sources 141 provided by a content provider 131 via network 120. In some implementations, the content provider 131 is a streaming media service (e.g., a streaming video service, a streaming audio service, etc.). Network 120 can generally include any type of wired or wireless communication channel capable of coupling together computing nodes. This includes, but is not limited to, a local area network, a wide area network, and a combination of networks. In some implementations, network 120 includes the Internet.

In general, the media device 103 may obtain instances of media items from any combination of: local content sources, content sources available via network 121, and content sources available via network 120.

In some implementations, the media device 103 includes a physical device. The physical device includes, but is not limited to, a digital video recorder, a satellite radio set top box, an over-the-air radio tuner, an over-the-air television tuner, a satellite television set top box, a cable television set top box, an Internet Protocol television set top box, and a game console.

In some implementations, the media device 103 includes a virtual device (e.g., a software module) executing on the client device 101. The virtual device includes, but is not limited to, a web browser executing on the client device 101 and a streaming media application executing on the client device 101.

In general, the media device 103 may include any combination of physical devices and virtual devices.

In some implementations, the network system 100 includes a server 110 coupled to network 120. In these implementations, the server 110 obtains metadata for instances of media items from a metadata provider 111 and/or from web sites on the Internet, builds a database of media items based on the metadata for the instances of the media items, and returns information relating to instances of media items satisfying search queries and that are available on content sources accessible to the client device 101. A content source that is accessible to the client device 101 (of a user 106) includes a content source for which the client device 101 has a subscription (e.g., a cable or satellite television channel, a streaming media service, etc.) a content source for which the client device 101 has an appropriate media device to receive media items from the content source (e.g., an over-the-air television or radio tuner, a network interface device, an application for a streaming media service, etc.), and a content source for which the client device 101 has purchased rights to obtain media items (e.g., a video-on-demand service, a video rental service, etc.). Note that the client device 101 may only be able to access a particular set of content sources. For example, the client device 101 may only have access to particular channels on a cable television service. Similarly, the client device 101 may have access to a first streaming media service, but not a second streaming media service. Thus, it is beneficial to provide the user 106 only with information for instances of media items that are available on content sources accessible to the client device 101.

The metadata for an instance of a media item include, but are not limited to, a content source on which the instance of the media item is available, dates and times when the instance of the media item is available, a description of the item, i.e., a title, actors associated with the instance of the media item, musicians associated with the instance of the media item, producers associated with the instance of the media item, directors associated with the instance of the media item, a synopsis of the instance of the media item, a first air date of the instance of the media item, a series for which the instance of the media item is a member (e.g., a television series, etc.), a genre (e.g., comedy, drama, game show, horror, suspense, reality, etc.) of the instance of the media item, and a cost of the instance of the media item.

The information relating to an instance of the media item include, but are not limited to, at least a subset of the metadata for the instance of the media item, links to content relating to the media item (e.g., a link to an a web page of an actor appearing in the media item, etc.), and content relating to the media item that is obtained from another database (e.g., a proprietary database) and/or from web pages including content related to the media item (e.g., a web page for a television program, a web page for an actor, etc.).

In some implementations, previously queries and search results are stored in a cache to speed up query responses. The previous queries and search results may be periodically removed from the cache to ensure that the cache is not storing search results for instances of media items that are no longer available (e.g., a show time of an episode of a television series may have passed since information relating to the instance of the episode was stored in the cache).

The server 110 is described in more detail below with reference to FIG. 2.

Note that although FIG. 1 illustrates that the client device 101 is coupled to one media device (e.g., the media device 103), one output device (e.g., the output device 102), and one input device (e.g., the input device 105), the client device 101 may be coupled to multiple media devices, multiple output devices, and multiple input devices. Similarly, although FIG. 1 illustrates one client device (e.g., the client device 101) and one metadata provider (e.g., metadata provider 111), the network system 100 may include multiple client devices and metadata providers. Moreover, although FIG. 1 illustrates one content provider (e.g., the content provider 130) coupled to network 121 and one content provider (e.g., the content provider 131) coupled to network 120, multiple content providers may be coupled to each network.

Furthermore, although FIG. 1 shows one instance of the server 110, multiple servers may be present in the network system 100. For example, the server 110 may include a plurality of distributed servers. The plurality of distributed servers may provide load balancing and/or may provide low-latency points of access to nearby computer systems. The distributed servers may be located within a single location (e.g., a data center, a building, etc.) or may be geographically distributed across multiple locations (e.g., data centers at various geographical locations, etc.).

The client device 101 is described in more detail below with reference to FIGS. 3, 4, and 6. The server 110 is described in more detail below with reference to FIGS. 2 and 5.

Figure 2:
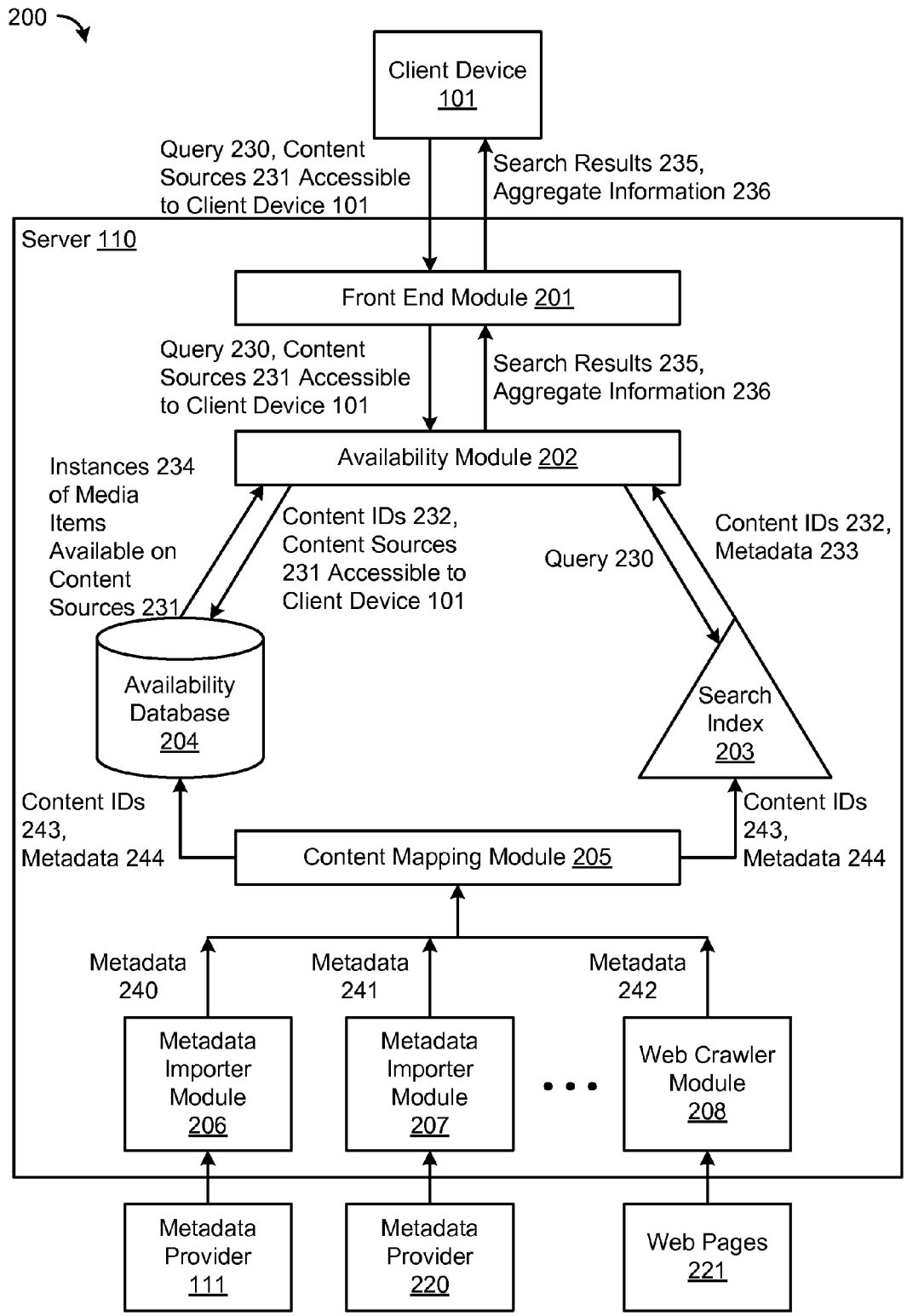
FIG. 2 is a block diagram illustrating example modules of a server, according to some implementations.

FIG. 2 is a block diagram illustrating example modules of the server 110, according to some implementations. The server 110 includes a front end module 201, an availability module 202, a content mapping module 205, metadata importer modules 206-207, and a web crawler module 208. The front end module 201 provides an interface between the modules of server 110 and the client device 101. The availability module 202 identifies instances of media items that satisfy a search query received from the client device 101 and that are available on content sources that are accessible to the client device 101. As discussed above, the client device 101 may be only able to access a particular set of content sources. Thus, it is beneficial to provide the user 106 only with information for instances of media items that are available on content sources accessible to the client device 101. The content mapping module 205 processes metadata obtained by the metadata importer modules 206-207 and the web crawler module 208 to generate a search index 203 and an availability database 204.

The following discussion illustrates an example process for importing metadata for instances of media items. The metadata importer modules 206-207 obtain metadata 240 and 241 for instances of media items from metadata providers 111 and 220, respectively. In some implementations, the server 110 includes a metadata importer module for each metadata provider. The web crawler module 208 imports and processes web pages 221 to produce metadata 242 for instances of media items. The metadata 240, 241 and 242 may include duplicate information. For example, the metadata provider 111 and the metadata provider 220 may both provide metadata for instances of media items available from a particular cable television service. However, each metadata provider may use different identifiers for the instances of the media items available from the particular cable television service. Thus, in some implementations, the content mapping module 205 analyzes the metadata 240, 241, and 242 for the instances of the media items to identify unique media items. For example, the content mapping module 205 identify unique media items by grouping instances of media items for which a predetermined subset of the metadata for the instances of the media items match (e.g., a group of instances of media items is formed when the series name, the episode number, and the actors match for each of the instances of the media items in the group, a release year etc.). In some implementations, a group of instances of media items is formed when the series name, the episode number, and the actors match for each of the instances of the media items in the group. In some implementations, a group of instances of media items is formed when the movie name, release year, and the actors match for each of the instance of the media items in the group. The content mapping module 205 then generates content identifiers 243 for each unique media item and generates metadata 244 for the unique media items. In some implementations, a content identifier includes an identifier for a series of related media items (e.g., a content identifier for a television series) and an identifier for a media item (e.g., a content identifier for an episode of the television series). The metadata 244 for a unique media item includes, but is not limited to, the content identifier 243 for the unique media item, at least a subset of the metadata 240, 241, and 242 for each instance of the unique media item. For example, Episode 1 of "The Simpsons" may have 6 instances across various content sources. The content mapping module 205 may assign a content identifier 243 having a value of "1" to Episode 1 of "The Simpsons" and may include metadata for each instance of Episode 1 of "The Simpsons." The content mapping module 205 uses the content identifiers 243 and the metadata 244 for the instances of the unique media items to generates a search index 203 that is used to efficiently identify content identifiers 243 for media items. The content mapping module 205 also uses the content identifiers 243 and the metadata 244 for the instances of the unique media items to generate an availability database 204 that is indexed by the content identifiers 243 and content sources on which the corresponding instances of the media items are available.

The following discussion illustrates an example process for responding to a search query from the client device 101. The front end module 201 receives a search query 230 from the client device 101 and dispatches the search query 230 to the availability module 202. Prior to dispatching the search query 230 to the availability module 202, the front end module 201 optionally normalizes and expands the search query 230. In some implementations, the front end module 201 optionally receives information relating to content sources 231 accessible to the client device 101 from the client device 101. In some implementations, the availability module 202 obtains the information relating to content sources 231 accessible to the client device 101 from a database (e.g., a profile of the user 106 of the client device 101, a profile for the client device 101, etc.). The availability module 202 queries the search index 203 using the search query 230 to obtain content identifiers 232 and metadata 233 for instances of media items that satisfy the search query 230. The availability module 202 then queries the availability database 204 using the content identifiers 232 and content sources 231 accessible to the client device 101 to obtain instances 234 of media items that are available on content sources 231 accessible to the client device 101. In other words, the instances 234 of media items are both (1) available on content sources 231 accessible to the client device 101 and (2) satisfy the search query 230.

The availability module 202 then generates search results 235 and aggregate information 236 based on the metadata 233 and the instances 234 of media items that are available on content sources 231 accessible to the client device 101. In some implementations the search results 235 include information relating to the instances 234 of media items (e.g., a name and/or an episode number for episodes of a television series, a name of a television series, a name of movie, etc.) and the aggregate information 236 corresponding to the unique media items. The aggregate information 236 of a media item includes, but is not limited to, a number of episodes of a series that are available on content sources 231 accessible to the client device 101, a most recent instance of the media item that is available on content sources 231 accessible to the client device 101 (e.g., an upcoming new episode, a newest episode that was previously aired, etc.), an oldest instance of the media item that is available on content sources 231 accessible to the client device 101 (e.g., a pilot episode, etc.), a completeness of the instances of the media item that are available on content sources 231 accessible to the client device 101 (e.g., all episodes are available), a number of unique content sources 231 on which the instances of the media item is accessible to the client device 101, a content source 231 that is most frequently selected, time periods during which the media item is available on the content sources 231, a future time at which the media item will be available on the content sources 231, a remaining time that the media item is accessible on the content source 231, and a date when the media item was purchased.

The availability module 202 then returns the search results 235 and/or the aggregate information 236 to the client device 101 via the front end module 201.

In some implementations, the modules of the server 110 are included in the client device 101 to facilitate searching of media items stored in the local content source 104.

Figure 3:
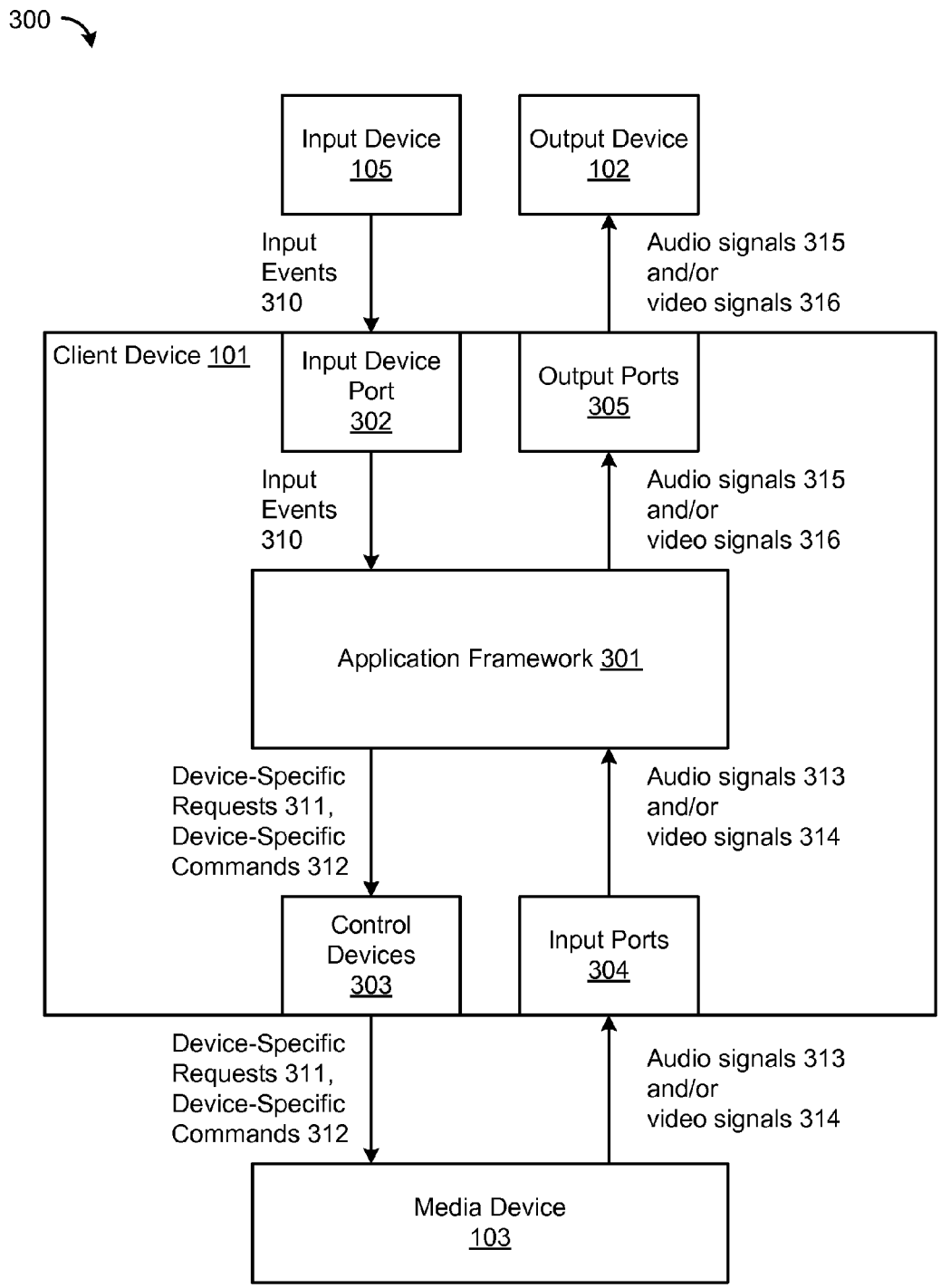
FIG. 3 is a block diagram illustrating example modules of a client device, according to some implementations.

FIG. 3 is a block diagram illustrating example modules of the client device 101, according to some implementations. In some implementations, the client device 101 includes an application framework 301 that uses control devices 303 to control devices coupled to the client device 101 (e.g., the media device 103, the output device 102, etc.) in response to input events received from the input device 105 and that is configured to provide enhanced multimedia functionality (e.g., as described above with reference to FIG. 1). The application framework 301 is described in more detail below with reference to FIG. 4.

In some implementations, the client device 101 includes an input device port 302, control devices 303, input ports 304, and output ports 305. The input device port 302 receives input events from the input device 105. The control devices 303 transmit device-specific requests and/or device-specific commands to the media device 103 and/or the output device 102. In some implementations, the control devices 303 include one or more of an infrared transceiver, a serial interface device, a Bluetooth transceiver, and a network interface device. The input ports 304 receive audio signals and/or video signals from the media device 103. The output ports 305 transmit audio signals and/or video signals to the output device 102. In some implementations the input ports 304 and the output ports 305 include one or more of a universal serial bus (USB) port, a Bluetooth transceiver, an Ethernet port, a Wi-Fi transceiver, an HDMI port, a DisplayPort port, a Thunderbolt port, a composite video port, a component video port, an optical port, and an RCA audio port.

In some implementations the output device 102 is integrated with the client device 101. For example, the client device 101 and the output device 102 may be included in the same housing (e.g., a television set).

The following discussion illustrates an example process for processing requests and/or commands received from the input device 105. The application framework 301 receives input events 310 from the input device 105 via the input device port 302. The input events 310 include, but are not limited to, key presses, pointer positions, pointing device button presses, scroll wheel positions, gestures, and selections of graphical user interface (GUI) objects (e.g., links, images, etc.).

One or more of the input events 310 may correspond to a device-agnostic request and/or a device-agnostic command. A device-agnostic request (e.g., a request to acquire a media device, a request to obtain instances of media items, etc.) is a generic request that may be issued to a plurality of devices regardless of the device-specific syntax of requests for the plurality of particular devices. Similarly, a device-agnostic command (e.g., a command to increase a volume level, a command to change a channel, etc.) is a generic command that may be issued to a plurality of devices regardless of the device-specific syntax of requests for the plurality of particular devices.

The application framework 301 maps device-agnostic requests to device-specific requests 311 for the media device 103. Similarly, the application framework 301 maps device-agnostic commands to device-specific commands 312 for the media device 103. The application framework transmits the device-specific requests 311 and/or the device-specific commands 312 to the media device 103 using the control devices 303.

In response to the device-specific requests 311 and/or the device-specific commands 312, the media device 103 transmits audio signals 313 and/or video signals 314 that the application framework 301 receives via the input ports 304.

The application 403 then generates audio signals 315 and/or video signals 316 using the audio signals 313 and/or video signals 314 to provide enhanced multimedia functionality (e.g., overlaying a GUI on the video signals 314, overlaying audio on the audio signals 313).

The application framework 301 then transmits the audio signals 315 and/or the video signals 316 to the output device 102 using the output ports 305.

In some implementations, the application framework 301 facilitates web searches and/or web browsing through a GUI that is displayed on the output device 102.

Figure 4:
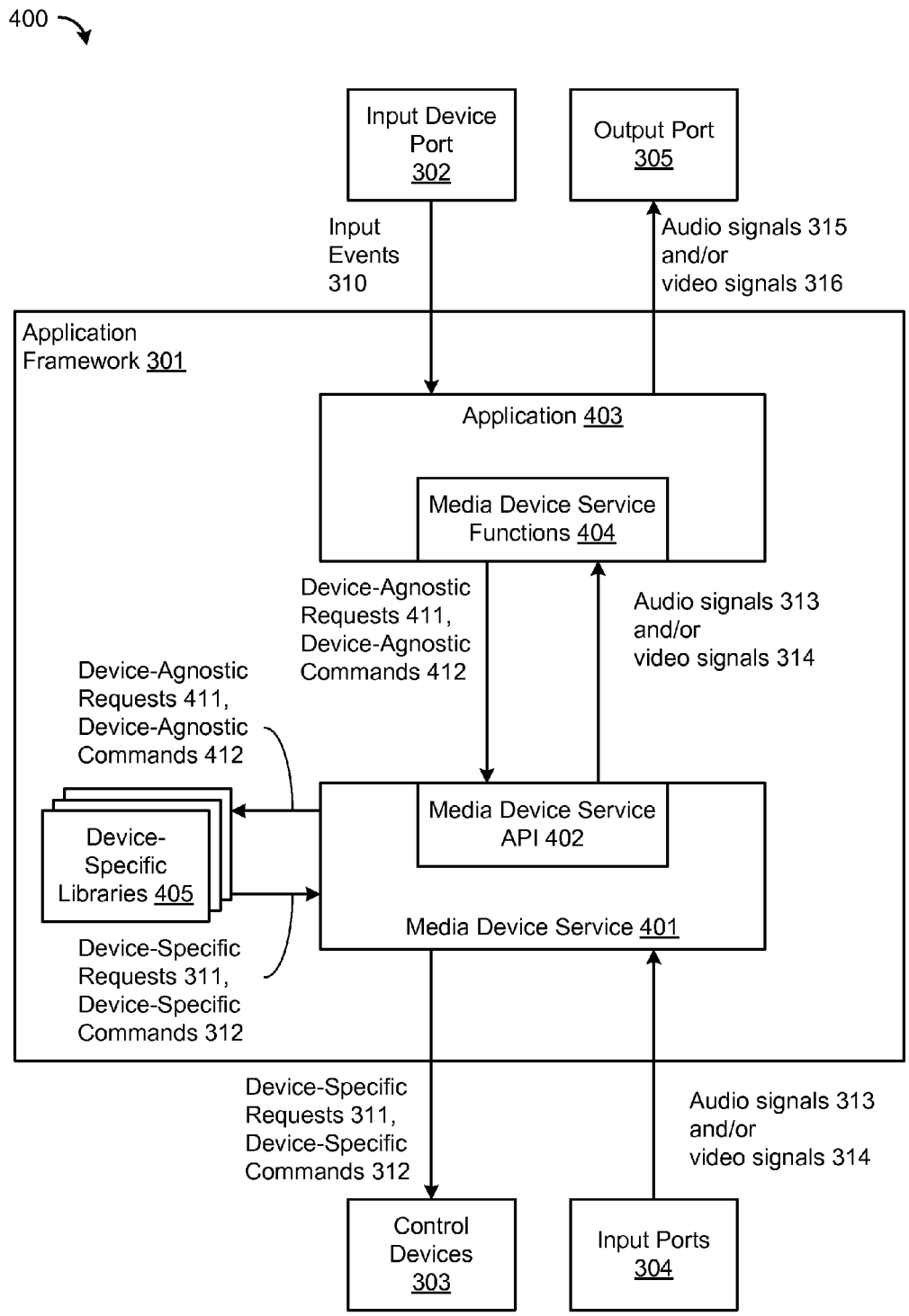
FIG. 4 is a block diagram illustrating example modules of an application framework, according to some implementations.

FIG. 4 is a block diagram illustrating modules of the application framework 301, according to some implementations. The application framework 301 includes a media device service 401 executing in the application framework 301, a media device service application programming interface (API) 402, an application 403 executing in the application framework 301, and device-specific libraries 405. The media device service 401 provides an abstract interface between the application 403, the media devices, and the output devices so that application developers can develop applications for the client device 101 without having to know the details (e.g., device-specific syntax, device-specific protocols, device-specific APIs, etc.) of particular media devices and/or particular output devices that are coupled to the client device 101. Furthermore, the media device service 401 hides the complexity of the asynchronous actions that occur between the client device 101, the output device 102, and the media device 103 by maintaining state transitions and monitoring the progress of these asynchronous actions. The device-specific libraries 405 provide mappings between device-agnostic requests and device-agnostic command received from the application 403 executing in the application framework 301 to device-specific requests and device-specific commands, respectively, for a target media device. These mappings allow application developers to call media device service functions 404 of the media device service API 402 to make requests to media devices (e.g., making device-agnostic requests to media devices) and/or to issue commands to media devices (e.g., issuing device-agnostic commands to media devices) without having to know beforehand which particular media devices a user is using or to which the user has access.

The following discussion illustrates an example process for processing requests and/or commands received from the input device 105. The application 403 receives the input events 310 and interprets the input events 310 requests and/or commands. The application 403 calls the media device service functions 404 of the media device service API 402 to issue device-agnostic request 411 and/or device-agnostic commands 412 to the media device service 401. The media device service 401 uses a device-specific library 405 for a target media device of device-agnostic request 411 and/or device-agnostic commands 412 to map the device-agnostic requests 411 and/or the device-agnostic commands 412 to the corresponding device-specific requests 311 and/or the corresponding device-specific commands 312, respectively. The media device service 401 then issues the device-specific requests 311 and/or the device-specific commands 312 to the control devices 303.

The media device service 401 provides the audio signals 313 and/or the video signals 314 to the application 403. The application 403 may enhance the audio signals 313 and/or the video signals 314 to produce the audio signals 315 and/or the video signals 316.

Figure 5:
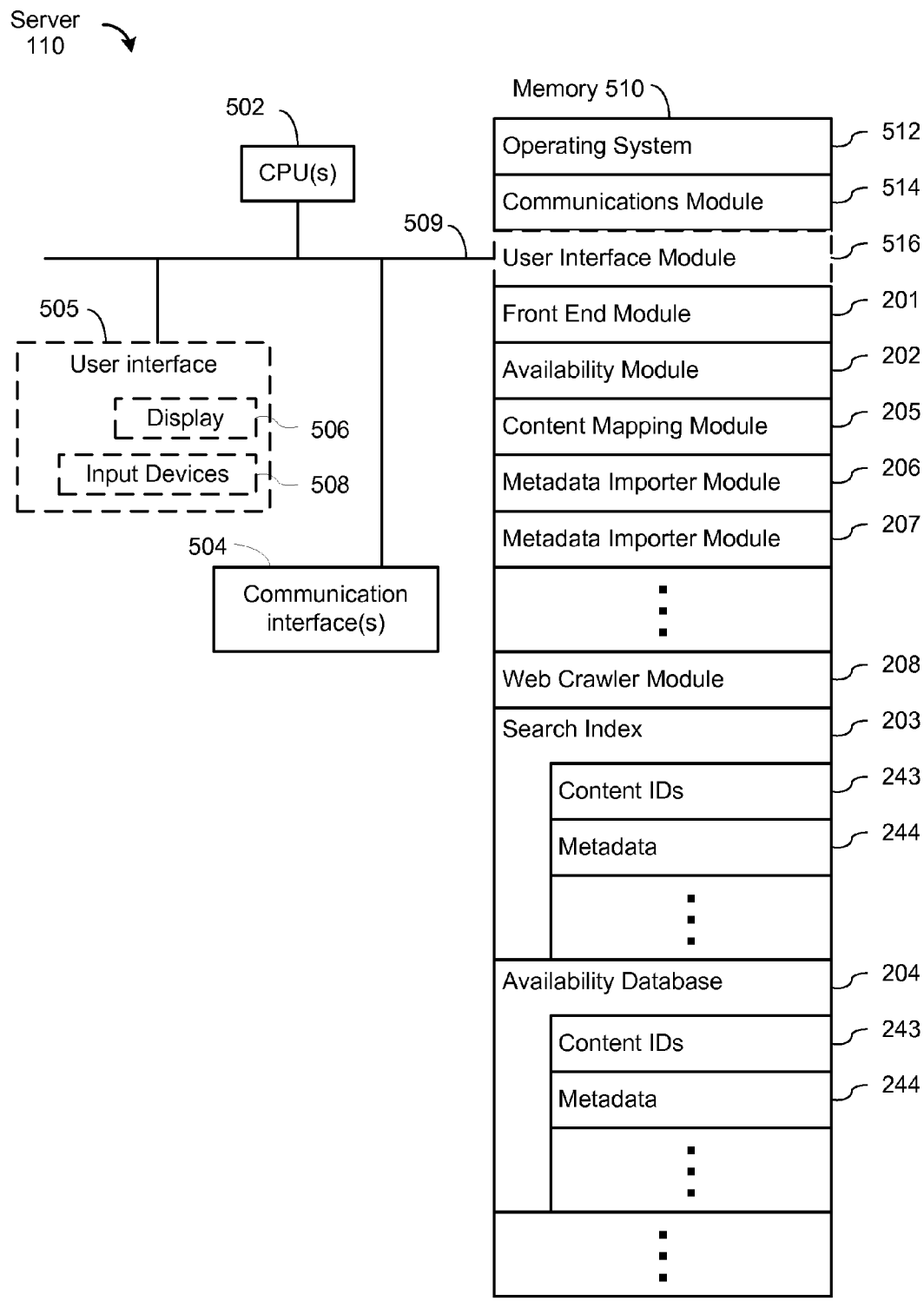
FIG. 5 is a block diagram illustrating an example server, according to some implementations.

FIG. 5 is a block diagram illustrating the server 110, according to some implementations. The server 110 typically includes one or more processing units (CPU's, sometimes called processors) 502 for executing programs (e.g., programs stored in memory 510), one or more network or other communications interfaces 504, memory 510, and one or more communication buses 509 for interconnecting these components. The communication buses 509 may include circuitry (sometimes called a chipset) that interconnects and controls communications between system components. The server 110 optionally includes (but typically does not include) a user interface 505 comprising a display device 506 and input devices 508 (e.g., keyboard, mouse, touch screen, keypads, etc.). Memory 510 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 510 optionally includes one or more storage devices remotely located from the CPU(s) 502. Memory 510, or alternately the non-volatile memory device(s) within memory 510, comprises a non-transitory computer readable storage medium. In some implementations, memory 510 or the computer readable storage medium of memory 510 stores the following programs, modules and data structures, or a subset thereof:

an operating system 512 that includes procedures for handling various basic system services and for performing hardware dependent tasks;

a communication module 514 that is used for connecting the server 110 to other computers via the one or more communication interfaces 504 (wired or wireless) and one or more communication networks, such as the Internet, other wide area networks, local area networks, metropolitan area networks, and so on;

an optional user interface module 516 that receives commands from the user via the input devices 508 and generates user interface objects in the display device 506;

the front end module 201, as described herein;

the availability module 202, as described herein;

the content mapping module 205, as described herein;

the metadata importer modules 206-207, as described herein;

the web crawler module 208, as described herein;

the search index 203 including the content identifiers 243 and the metadata 244 for instances of media items, as described herein; and the availability database 204 including the content identifiers 243 and the metadata 244 for instances of media items, as described herein.

In some implementations, the programs or modules identified above correspond to sets instructions for performing a function described above. The sets of instructions can be executed by one or more processors (e.g., the CPUs 502). The above identified modules or programs (i.e., sets of instructions) need not be implemented as separate software programs, procedures or modules, and thus various subsets of these programs or modules may be combined or otherwise re-arranged in various implementations. In some implementations, memory 510 stores a subset of the modules and data structures identified above. Furthermore, memory 510 may store additional modules and data structures not described above.

Although FIG. 5 shows a "server," FIG. 5 is intended more as functional description of the various features which may be present in a set of servers than as a structural schematic of the implementations described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement the server 110 and how features are allocated among them will vary from one implementation to another, and may depend in part on the amount of data traffic that the system must handle during peak usage periods as well as during average usage periods.

Figure 6:
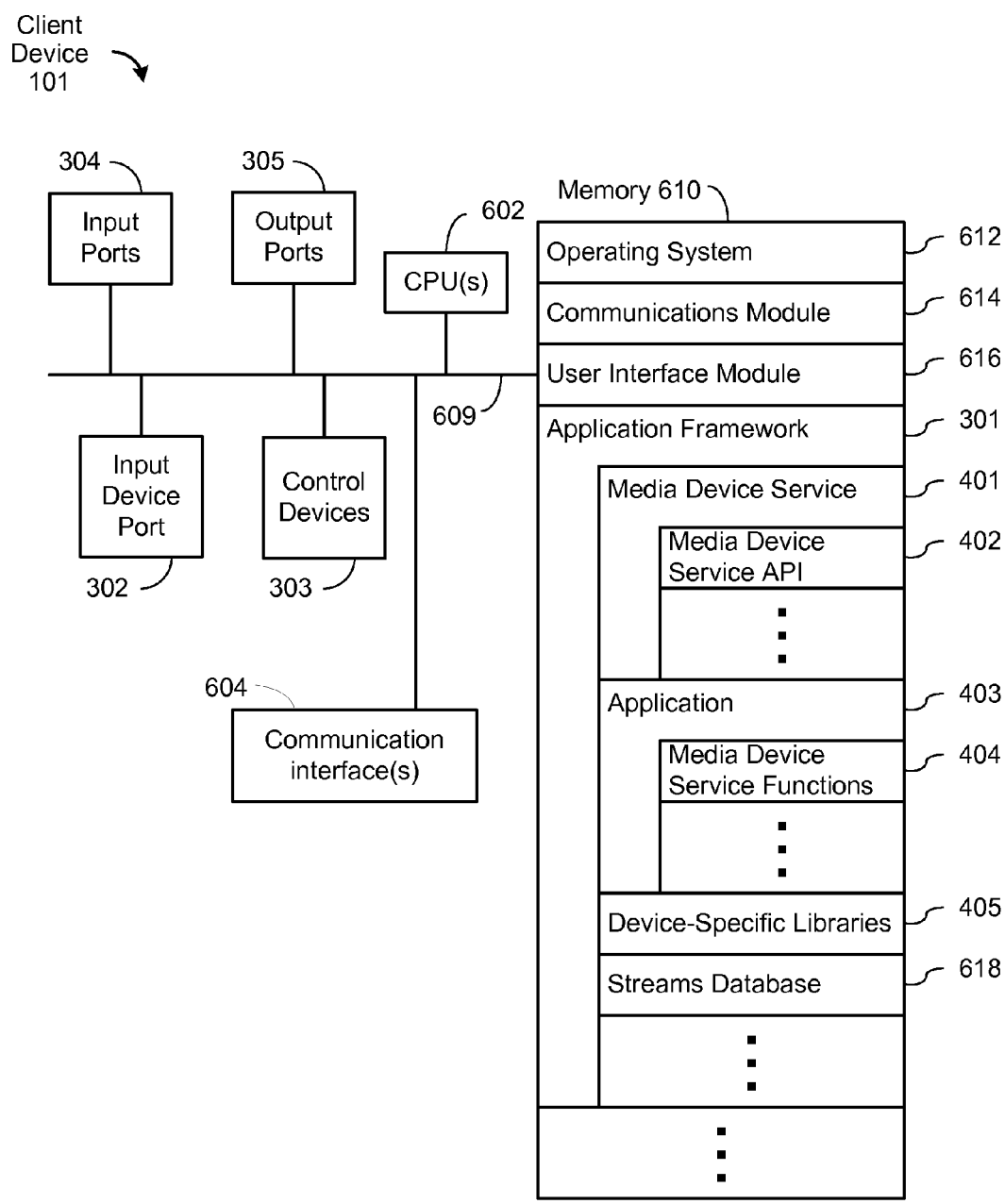
FIG. 6 is a block diagram illustrating an example client device, according to some implementations.

FIG. 6 is a block diagram illustrating the client device 101, according to some implementations. The client device 101 typically includes one or more processing units (CPU's, sometimes called processors) 602 for executing programs (e.g., programs stored in memory 610), one or more network or other communications interfaces 604, memory 610, the input device port 302, the control devices 303, the input ports 304, the output ports 305, and one or more communication buses 609 for interconnecting these components. The communication buses 609 may include circuitry (sometimes called a chipset) that interconnects and controls communications between system components. Memory 610 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 610 optionally includes one or more storage devices remotely located from the CPU(s) 602. Memory 610, or alternately the non-volatile memory device(s) within memory 610, comprises a non-transitory computer readable storage medium. In some implementations, memory 610 or the computer readable storage medium of memory 610 stores the following programs, modules and data structures, or a subset thereof:

- an operating system 612 that includes procedures for handling various basic system services and for performing hardware dependent tasks;
- a communication module 614 that is used for connecting the client device 101 to other computers via the one or more communication interfaces 604 (wired or wireless) and one or more communication networks, such as the Internet, other wide area networks, local area networks, metropolitan area networks, and so on;
- a user interface module 616 that receives commands from the user via the input devices 608 and generates user interface objects in a display device (e.g., the output device 102);
- the application framework 301 including the media device service 401 itself including the media device service API 402, the application 403 itself including the media device service functions 404, and the device-specific libraries 405, as described herein; and
- a streams database 618 that stores URIs video streams and information related to video streams, as described herein.

In some implementations, the programs or modules identified above correspond to sets instructions for performing a function described above. The sets of instructions can be executed by one or more processors (e.g., the CPUs 602). The above identified modules or programs (i.e., sets of instructions) need not be implemented as separate software programs, procedures or modules, and thus various subsets of these programs or modules may be combined or otherwise re-arranged in various implementations. In some implementations, memory 610 stores a subset of the modules and data structures identified above. Furthermore, memory 610 may store additional modules and data structures not described above.

Although FIG. 6 shows a "client device," FIG. 6 is intended more as functional description of the various features which may be present in a client device than as a structural schematic of the implementations described herein. In practice, and as recognized by those of ordinary skill in the art, items shown separately could be combined and some items could be separated.

Populating a Streams Database

As discussed above, it is desirable for an application executing on the client device 101 to obtain video streams from media devices that are accessible to the client device so that these video streams may be displayed on the output device 103. Since an application developer does not know which media devices will be coupled to the client device 101 during development of the application, some implementations provide a universal resource identifier (URI) addressing mechanism that allows the application to refer to video streams without having to know specific details of media devices from which the video streams are available. URIs and information related to video streams available from media devices that are accessible to the client device 101 are stored in a streams database (e.g., the streams database 618).

In some implementations, a video stream is a data stream that only includes video data. In these implementations, audio data corresponding to the video data of the video stream is included in a separate audio stream that is synchronized with the video stream (e.g., using timestamps, keyframes, etc.).

In some implementations, a video stream is a data stream that includes video data and audio data. For example, the video stream may be a data container that includes video data and audio data. In these implementations, the video stream may also be referred to as a multimedia stream.

Figure 7:
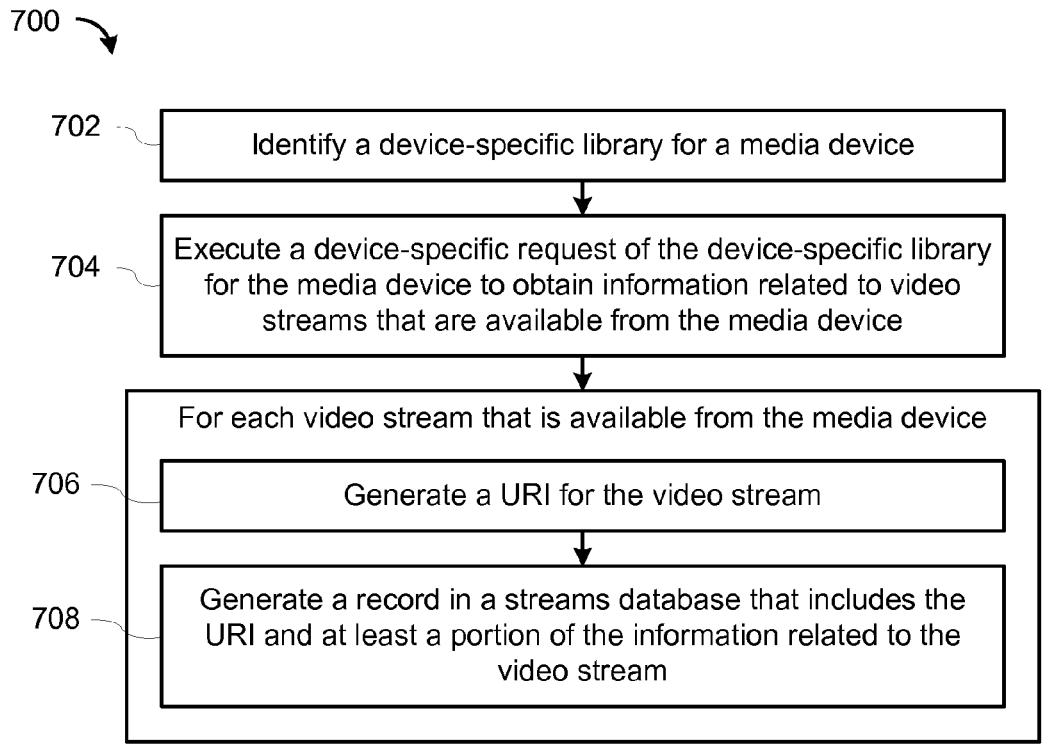
FIG. 7 is a flowchart of a method for populating a streams database with information relating to video streams, according to some implementations.

FIG. 7 is a flowchart of a method 700 for populating the streams database 618 with information relating to video streams, according to some implementations. The media device service 401 identifies (702) a device-specific library (e.g., the device-specific library 405) for a media device (e.g., the media device 103). As discussed above, a device-specific library for a media device includes mappings between device-agnostic requests and device-specific requests that are executable by the client device 101 to perform requests with respect to the media device.

The media device service 401 executes (704) a device-specific request of the device-specific library for the media device to obtain information related to the video streams that are available from the media device. In some implementations, the information related to a respective video stream includes at least one of: an identifier of the respective video stream, an episode identifier, a name of the respective video stream, a channel number, a start time, an end time, a type of the video stream, a grouping key that is used to group episodes of a series together, a date and/or time that the video stream was created, a date and/or time that the video stream was recorded, and alternate names for the video stream (e.g., to facilitate searching).

For each video stream that is available from the media device, the media device service 401 performs the following operations. The media device service 401 generates (706) a URI for the video stream, where the URI includes a type of the video stream and at least one of a name of the video stream and device-specific parameters for the video stream. The media device service 401 then generates (708) a record in the streams database 618 that includes the URI and at least a portion of the information related to the video stream. As discussed above, the streams database includes records for video streams that are available from media devices that are accessible to the client device 101.

In some implementations, the type of video stream includes at least one of: a channel video stream (e.g., a channel available from a television service, such as over-the-air television service, cable television service, satellite television service, etc.), a program video stream (e.g., a particular video program on a television service, such as a particular episode of a television series, etc.), a video on demand video stream (e.g., a particular video that is available on a video on demand service), a digital video recorder video stream (e.g., a particular video recording on a digital video recorder), and a device video stream (e.g., a video stream from a media device such as a DVD player, etc.).

In some implementations, the name of the video stream is an abstract reference to the video stream. For example, if the video stream is an episode of a television series, the name of the video stream may be the name of the episode. If the video stream is a channel video stream, the name of the video stream may be a name of the channel (e.g., "CNN"). If the video stream is a device videos stream, the name of the video stream may be a name of the device (e.g., "DVD" for video streams that are available from a DVD player).

In some implementations, the device-specific parameters include at least one of: an identifier of the media device, an identifier for a channel lineup, an identifier of the video stream, an episode identifier, a name of the video stream, a channel number, a start time, and an end time. These device-specific parameters may be used to access and/or identify the video stream referred to by the URI. In some implementations, the device-specific parameters are used to disambiguate a video stream from a plurality of video streams. For example, if there are two instances of a particular episode of a television program, the device-specific parameters may include information to distinguish between the two instances (e.g., a channel number, a start and/or end time, etc.). Similarly, if there are two DVD players coupled to the client device 101, the device-specific parameters may include a device identifier for the DVD player to distinguish between the two DVD players.

In some implementations, a particular URI is one of a plurality of URI types, including, but not limited to, a program URI that refers to a particular program that is available in a television service (e.g., an over-the-air television service, a cable television service, a satellite television service, etc.), a channel URI that refers to a particular channel of a television service, a device URI that refers to a particular device coupled to the client device 101, a digital video recorder URI that refers to a particular recording on a digital video recorder or refers to a particular digital video recorder, and a video-on-demand URI that refers to a particular video program that is available through a video-on-demand service. Examples of the aforementioned URIs are provided below:

An example program URI is: "tv://program/?channelNumber=313&lineupId=DISH807&startTime=1258725000&endTime=1258731600", where "program" represents the type of the video stream (e.g., a program video stream) and the portion of the URI that comes after the "?" are device-specific parameters that are usable by a device-specific library to identify the video stream to which the URI refers (e.g., a program that is on channel 313 of channel lineup DISH807 having a start time of 1258725000 and an end time of 1258731600).

An example channel URI is: "tv://channel/CNN", where "channel" represents the type of the video stream (e.g., a channel video stream) and "CNN" represents the name of the video stream (e.g., the channel CNN).

An example device URI is: "tv://device/dvd", where "device" represents the type of the video stream (e.g., a device video stream) and "dvd" represents the name of the video stream (e.g., a DVD video stream). Other names may include "passthrough" (e.g., used to pass through video stream) and "bluray" (e.g., used for Blu-ray video streams).

An example digital video recorder URI is: "tv://dvr/a93jfadb", where "dvr" represents the type of the video stream (e.g., a digital video recorder video stream) and "a93jfadb" the name of the video stream (e.g., an opaque name that is generated by the digital video recorder to represent a particular video recording on the digital video recorder). Another example digital video recorder URI is: "tv://dvr/recording?name=Batman%20Begins", where "dvr" represents the type of the video stream (e.g., a digital video recorder video stream) and the portion of the URI after the "?" represents the device-specific parameters that are usable by the device-specific library to identify the video stream to which the URI refers (e.g., a recording on the digital video recorder that has the name "Batman Begins").

An example video-on-demand URI is: "tv://vod/?lineupId=COMCAST000&id=guda094jgg43g", where "vod" represents the type of the video stream (e.g., a video-on-demand video stream) and the portion of the URI after the "?" represents the device-specific parameters that are usable by the device-specific library to identify the video stream to which the URI refers (e.g., a video-on-demand video stream that is available on Comcast having an identifier "guda094jgg43g"). Another example video-on-demand URI is: "tv://vod/?name=Bruno", where "vod" represents the type of the video stream (e.g., a video-on-demand video stream) and the portion of the URI after the "?" represents the device-specific parameters that are usable by the device-specific library to identify the video stream to which the URI refers (e.g., a video-on-demand video stream having the name "Bruno").

In some implementations, the method 700 is repeated for each media device that is coupled to the client device 101.

Although the method 700 illustrates that the media device service 401 initiates the request (e.g., a pull method) to obtain information related to video streams that are available from the media device (e.g., operation 704 in FIG. 7) that are accessible to the client device 101, the media device service 401 may obtain this information through other mechanisms. In some implementations, the media device publishes the information related to video streams that are available from the media device to which the client device 101 subscribes. In some implementations, the media device pushes the information related to video streams that are available from the media device to the client device 101. In some implementations, the media device service 401 queries the server 110 to obtain related to video streams that are available from the media device (e.g., as described above with reference to FIG. 2). In these implementations, the media device service 401 transmits a query and a list of content sources (e.g., media devices) accessible to the client device 101 to the server 110. The server 110 then returns search results (e.g., the search results 235) that include information relating to video streams that are available from the media device.

Note that although the aforementioned URIs refer to video streams, other URIs may be available to the application. In some implementations, a guide URI is provided to obtain a program guide. For example, the guide URI may be "tv://guide/", where "guide" indicates that the URI is a guide URI. In some implementations, a search URI is provided to search video streams that are available in the streams database 618. For example, the search URI may be "tv://search/?type=channel&name=CNN", where "search" indicates that the URI is a search URI, "type=channel?name=CNN" indicates that the search is directed to a channel video stream that has a name "CNN". Thus, this search URI may be used to find all channel streams with the name "CNN". In another example, the search URI may be "tv://search/?type=dvr&title=Batman", where "search" indicates that the URI is a search URI, "type=dvr&title=Batman" indicates that the search is directed to digital video recorder video streams that have a title "Batman". Thus, this search URI may be used to find all digital video recorder video stream with the title "Batman".

Obtaining URIs for Video Streams

After the streams database 618 is populated with video streams that are available from media device that are accessible to the client device 101, an application (e.g., the application 403) executing on the client device 101 may query the streams database 618 to obtain URIs for video streams that are available from the media device.

Figure 8:
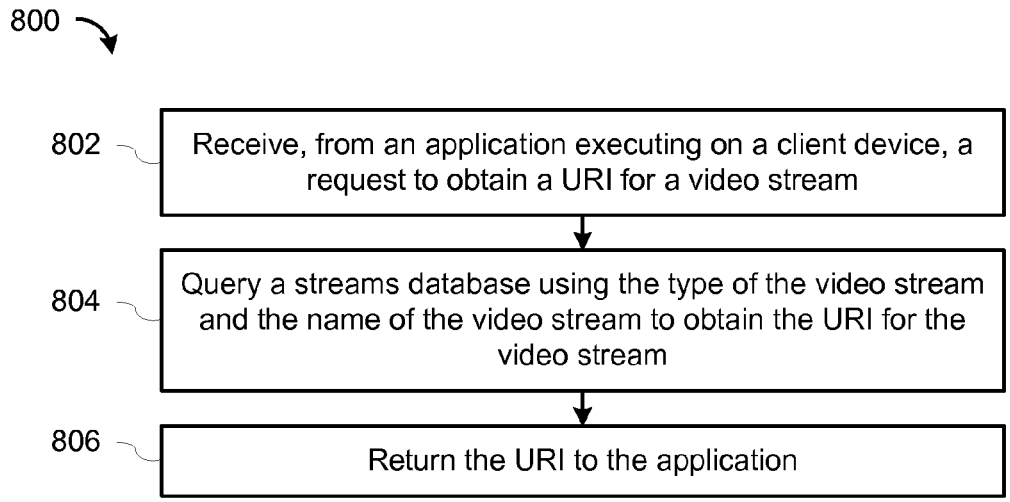
FIG. 8 is a flowchart of a method for obtaining universal resource identifiers for video streams, according to some implementations.

FIG. 8 is a flowchart of a method 800 for obtaining universal resource identifiers for video streams, according to some implementations. The media device service 401 receives (802) a request to obtain a URI for a video stream from an application (e.g., the application 403) executing on the client device 101, where the request to obtain the URI (e.g., a URI as described above) for the video stream includes a type of the video stream and a name of the video stream.

The media device service 401 queries (804) the streams database 618 using the type of the video stream and the name of the video stream to obtain the URI for the video stream. As discussed above, the streams database includes records for video streams that are available from media devices that are accessible to the client device.

The media device service 401 returns (806) the URI to the application, where the URI includes the type of the video stream and at least one of the name of the video stream and device-specific parameters for the video stream.

Obtaining Video Streams

After receiving a URI from the streams database 618, an application (e.g., the application 403) executing on the client device 101 may use the URI for video streams that are available from the media device (e.g., the media device 103).

Figure 9:
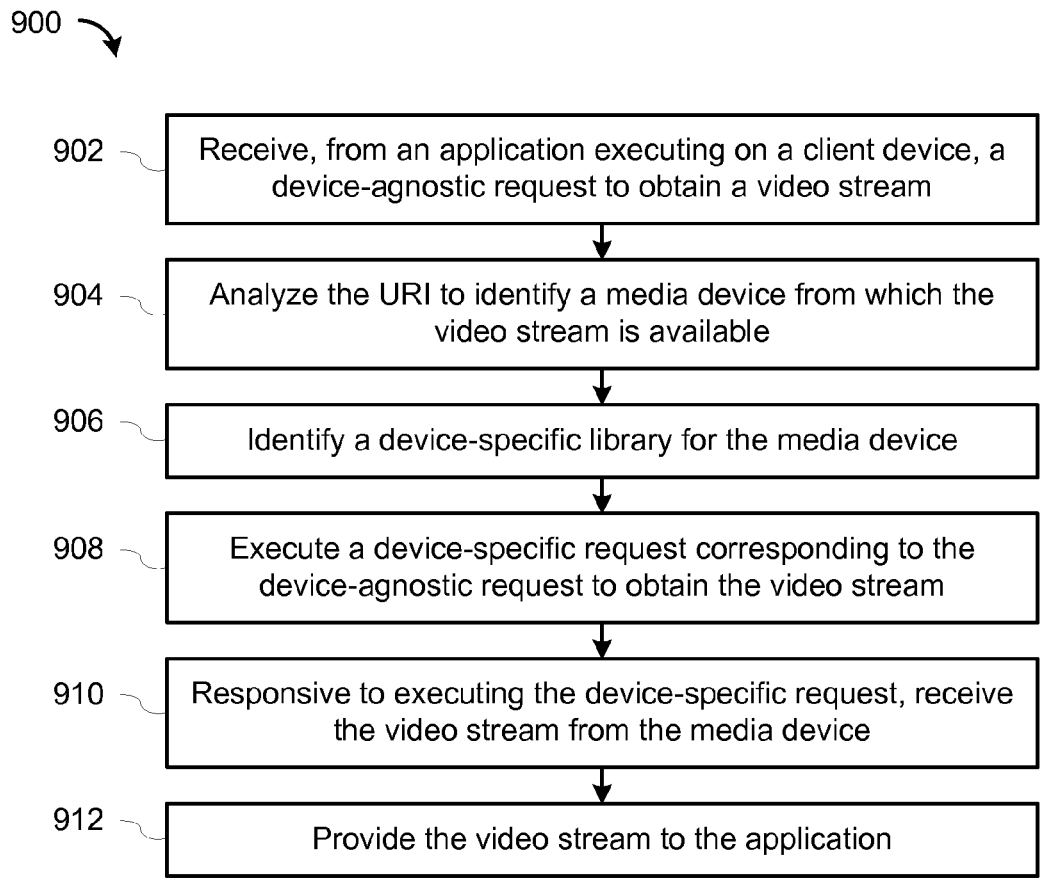
FIG. 9 is a flowchart of a method for obtaining video streams, according to some implementations.

FIG. 9 is a flowchart of a method 900 for obtaining video streams, according to some implementations. The media device service 401 receives (902) a device-agnostic request to obtain a video stream from an application (e.g., the application 403) executing on the client device 101, where the device-agnostic request includes a URI for the video stream (e.g., a URI as described above). The URI includes a type of the video stream and at least one of a name of the video stream and device-specific parameters for the video stream. For example, the URI may be "tv://channel/CNN" where "channel" represents the type of the video stream (e.g., a channel that is available from a television service) and "CNN" is a name of the video stream (e.g., the channel CNN).

Figure 10:
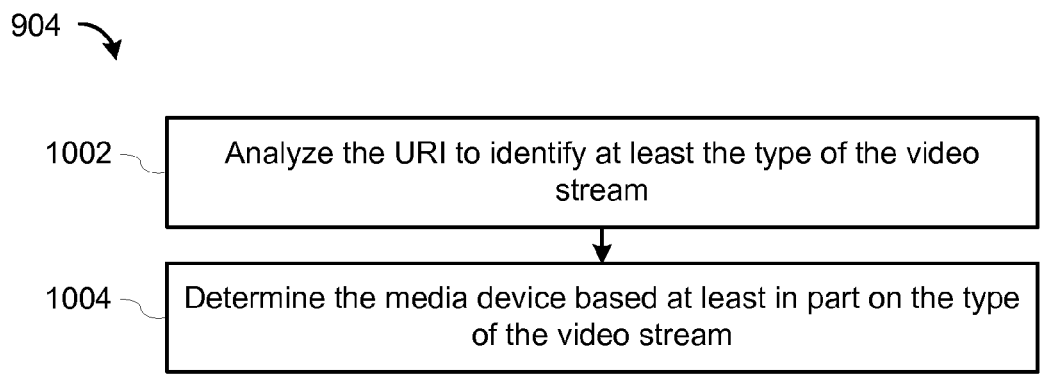
FIG. 10 is a flowchart of a method for analyzing a URI to identify a media device from which a video stream is available, according to some implementations.

The media device service 401 analyzes (904) the URI to identify a media device from which the video stream is available. Attention is now directed to FIG. 10, which is a flowchart of a method for analyzing (904) a URI to identify a media device from which a video stream is available, according to some implementations. The media device service 401 analyzes (1002) the URI to identify at least the type of the video stream and determines (1004) the media device based at least in part on the type of the video stream. Continuing the example from above, assuming that the client device 101 is coupled to a cable set top box, the media device service 401 identifies the cable set top box as the media device from which the channel video stream for CNN is available.

Returning to FIG. 9, the media device service 401 identifies (906) a device-specific library for the media device. As discussed above, the device-specific library for the media device includes mappings between device-agnostic requests and device-specific requests that are executable by the client device 101 to perform requests with respect to the media device. Continuing the example from above, the media device service 401 identifies the device-specific library for the cable set top box.

The media device service 401 executes (908) a device-specific request corresponding to the device-agnostic request to obtain the video stream, where the device-specific request includes the URI. For example, since the device-agnostic request is a request to obtain the video stream, the media device service 401 executes a device-specific request for obtaining video streams to obtain the video stream from the media device.

Responsive to executing the device-specific request, the media device service 401 receives (910) the video stream from the media device and provides (912) the video stream to the application. As discussed above, the application may enhance or otherwise modify the video stream prior to being output to the output device 102.

The methods illustrated in FIGS. 7-10 may be governed by instructions that are stored in a computer readable storage medium and that are executed by one or more processors of a client device. Each of the operations shown in FIGS. 7-10 may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A computer-implemented method, comprising:
at a client device communicatively coupled to one or more media devices, the client device having one or more processors and memory:
for a particular media device of the one or more media devices, sending a device-specific request to the particular media device to obtain information related to the video streams that are available from the particular media device;
in response to the device-specific request, obtaining the information related to the video streams that are available from the particular media device; and
for each video stream that is available from the particular media device:
determining a video stream type for the video stream;
based on the video stream type, generating a particular type of universal resource identifier (URI) for the video stream selected from a plurality of URI types, the URI including the video stream type and at least one device-specific parameter for the video stream; and
generating a record in a streams database located at the client device, the record including the URI and at least a portion of the information related to the video stream;
receiving, from an application executing on the client device, a request to obtain a first URI for a particular video stream;
in accordance with the request, obtaining the first URI from the streams database;
after obtaining the first URI:
receiving, from the application executing on the client device, a request to obtain the particular video stream, the request including the first URI;
obtaining the particular video stream from a first media device identified by the first URI, wherein the first media device is one of the one or more media devices; and
outputting the particular video stream for display at an output device.

2. The computer-implemented method of claim 1, wherein the information related to a respective video stream is selected from the group consisting of:
an identifier of the respective video stream;
an episode identifier;
a name of the respective video stream;
a channel number;
a start time; and
an end time.

3. The computer-implemented method of claim 1,
wherein the request to obtain the first URI includes a type of the particular video stream and a name of the particular video stream; and
wherein obtaining the first URI from the streams database comprises querying the streams database using the type of the particular video stream and the name of the particular video stream.

4. The computer-implemented method of claim 3, wherein receiving the request to obtain the particular video stream comprises receiving, from the application, a device-agnostic request to obtain the particular video stream, the device-agnostic request including the first URI, the method further comprising:
analyzing the first URI to identify a media device from which the particular video stream is available;
identifying a device-specific library for the media device;
executing a device-specific request corresponding to the device-agnostic request to obtain the particular video stream, the device-specific request including the first URI;
wherein obtaining the particular video stream comprises:
responsive to executing the device-specific request, receiving the particular video stream from the media device; and
providing the particular video stream to the application.

5. The computer-implemented method of claim 4, wherein analyzing the first URI to identify the media device from which the particular video stream is available includes:
analyzing the first URI to identify at least the type of the particular video stream; and
determining the media device based at least in part on the type of the particular video stream.

6. The computer-implemented method of claim 1, wherein the type of video stream is selected from the group consisting of:
a channel video stream;
a program video stream;
a video on demand video stream;
a digital video recorder video stream; and
a device video stream.

7. The computer-implemented method of claim 1, further comprising, for each video stream that is available from the particular media device, determining one or more device-specific parameters for the video stream based on the video stream type;
wherein the one or more device-specific parameters include the at least one device-specific parameter; and
wherein the one or more device-specific parameters are selected from the group consisting of:
an identifier of the media device;
an identifier for a channel lineup;
an identifier of the video stream;

an episode identifier;
a name of the video stream;
a channel number;
a start time; and
an end time.

8. A client system, comprising:
at least one processor;
memory; and
at least one program stored in the memory and executable by the at least one processor, the at least one program comprising instructions to:
for a particular media device of one or more media devices coupled to the client system, send a device-specific request to the particular media device to obtain information related to the video streams that are available from the particular media device
in response to the device-specific request, obtain the information related to the video streams that are available from the particular media device; and
for each video stream that is available from the particular media device:
determine a video stream type for the video stream;
based on the video stream type, generate a particular type of universal resource identifier (URI) for the video stream selected from a plurality of URI types, the URI including the video stream type and at least one device-specific parameter for the video stream; and
generate a record in a streams database located at the client system, the record including the URI and at least a portion of the information related to the video stream;
receive, from an application executing on the client device, a request to obtain a first URI for a particular video stream;
in accordance with the request, obtaining the first URI from the streams database;
after obtaining the first URI:
receive, from the application executing on the client device, a request to obtain the particular video stream, the request including the first URI;
obtain the particular video stream from a first media device identified by the first URI, wherein the first media device is one of the one or more media devices; and
output the particular video stream for display at an output device.

9. The system of claim 8, wherein the information related to a respective video stream is selected from the group consisting of:
an identifier of the respective video stream;
an episode identifier;
a name of the respective video stream;
a channel number;
a start time; and
an end time.

10. The system of claim 8, wherein:
wherein the request to obtain the first URI includes a type of the particular video stream and a name of the particular video stream;
wherein obtaining the first URI from the streams database comprises querying the streams database using the type of the particular video stream and the name of the particular video stream.

11. The system of claim 10, wherein the instructions to receive the request to obtain the particular video stream include instructions to receive, from the application, a device-agnostic request to obtain the particular video stream, the device-agnostic request including the first URI, the at least one program further including instructions to:
analyze the first URI to identify a media device from which the particular video stream is available;
identify a device-specific library for the media device;
execute a device-specific request corresponding to the device-agnostic request to obtain the particular video stream, the device-specific request including the first URI;
wherein the instructions to obtain the particular video stream include instructions to:
responsive to executing the device-specific request, receive the particular video stream from the media device; and
provide the particular video stream to the application.

12. The system of claim 11, wherein the instructions to analyze the first URI to identify the media device from which the particular video stream is available include instructions to:
analyze the first URI to identify at least the type of the particular video stream; and
determine the media device based at least in part on the type of the particular video stream.

13. The system of claim 8, wherein the type of video stream is selected from the group consisting of:
a channel video stream;
a program video stream;
a video on demand video stream;
a digital video recorder video stream; and
a device video stream.

14. The system of claim 8, wherein the at least one program further comprises instructions to, for each video stream that is available from the particular media device, determine one or more device-specific parameters for the video stream based on the video stream type;
wherein the one or more device-specific parameters include the at least one device-specific parameter; and
wherein the one or more device-specific parameters are selected from the group consisting of:
an identifier of the media device;
an identifier for a channel lineup;
an identifier of the video stream;
an episode identifier;
a name of the video stream;
a channel number;
a start time; and
an end time.

15. A computer-implemented method, comprising:
at a client device communicatively coupled to one or more media devices, the client device having one or more processors and memory:
populating a streams database with information relating to respective video streams that are available from a respective media device accessible to the client device;
receiving, from an application executing on the client device, a request to obtain a first universal resource identifier (URI) for a particular video stream;
in accordance with the request, obtaining the first URI from the streams database;
after obtaining the first URI:
receiving, from an application executing on the client device, a device-agnostic request to obtain the particular video stream, the device-agnostic request including the first URI, the first URI having a particular URI type and including a type of the particular video stream and at least one device-specific parameter for the particular video stream, and wherein the first URI is a record contained within the streams database;

identifying, based on the URI type, a media device from which the particular video stream is available;

identifying a device-specific library for the media device at the client device, the device-specific library for the media device including mappings between device-agnostic requests and device-specific requests that are executable by the client device to perform requests with respect to the media device;

sending a device-specific request corresponding to the device-agnostic request to obtain the particular video stream from the media device;

responsive to executing the device-specific request, receiving the particular video stream from the media device; and providing the particular video stream to the application.

16. The computer-implemented method of claim 15, wherein the request to obtain the first URI includes the type of the video stream and the name of the video stream;

wherein obtaining the first URI from the streams database comprises querying the streams database using the type of the particular video stream and the name of the particular video stream, the streams database including records for video streams that are available from media devices that are accessible to the client device.

17. The computer-implemented method of claim 15, wherein populating the streams database comprises:

identifying a respective device-specific library for the respective media device;

executing a respective device-specific request of the respective device-specific library for the respective media device to obtain information related to the respective video streams that are available from the respective media device; and for each respective video stream that is available from the respective media device:

generating a respective URI for the respective video stream, the respective URI including a respective type of the respective video stream and at least one of a respective name of the respective video stream and respective device-specific parameters for the respective video stream; and generating a respective record in the streams database located at the client device, the record including the respective URI and at least a portion of the information related to the respective video stream.

18. The computer-implemented method of claim 17, wherein the information related to the respective video stream is selected from the group consisting of:

an identifier of the respective video stream;
an episode identifier;
a name of the respective video stream;
a type of the video stream;
a grouping key; and
alternate names for the video stream.

19. The computer-implemented method of claim 15, wherein analyzing the first URI to identify the media device from which the particular video stream is available includes:

analyzing the first URI to identify at least the type of the particular video stream; and determining the media device based at least in part on the type of the particular video stream.

20. The computer-implemented method of claim 15, wherein the type of particular video stream is selected from the group consisting of:

a channel video stream;
a program video stream;
a video on demand video stream;
a digital video recorder video stream; and
a device video stream.

21. The computer-implemented method of claim 15, wherein the device-specific parameters are selected from the group consisting of:

an identifier of the media device;
an identifier for a channel lineup;
an identifier of the video stream;
an episode identifier;
a name of the video stream;
a channel number;
a start time; and
an end time.

22. The method of claim 1, further comprising:

generating a search URI for a particular search query, the search URI including a type of video stream to be searched and one or more search query terms; and generating a record for the search URI in the streams database, the record including the URI.

* * * * *

UNITED STATES PATENT AND TRADEMARK OFFICE
CERTIFICATE OF CORRECTION

PATENT NO. : 9,918,115 B2  
APPLICATION NO. : 14/350022  
DATED : March 13, 2018  
INVENTOR(S) : Koh et al.

Page 1 of 1

It is certified that error appears in the above-identified patent and that said Letters Patent is hereby corrected as shown below:

In the Claims

Claim 10, Column 19, Lines 57-58, please delete "claim 8, wherein: wherein the" and insert --claim 8, wherein the--.

Signed and Sealed this  
Twenty-second Day of May, 2018

Andrei Iancu  
*Director of the United States Patent and Trademark Office*